May 6, 1941.                J. B. HAYS                2,240,929
                         TESTING APPARATUS
                        Filed Nov. 22, 1939

INVENTOR
J. B. HAYS
BY
*[signature]*
ATTORNEY

Patented May 6, 1941

2,240,929

UNITED STATES PATENT OFFICE 2,240,929

TESTING APPARATUS

James B. Hays, Cambridge, Mass., assignor to Bell Telephone Laboratories, Incorporated, New York, N. Y., a corporation of New York Application November 22, 1939, Serial No. 305,682

10 Claims. (Cl. 175—183)

This invention relates to an apparatus for measuring resistance and more particularly to an apparatus for the continuous measurement of insulation resistance of insulated conductors during the process of installing them underground by the plowing-in method.

During the process of installing wires underground by this method it occasionally happens that the insulation becomes injured in some way or that the conductor itself may break. It is therefore necessary that some means be provided for immediately indicating the existence of such an injury to the insulation or breakage of a wire to permit the same to be repaired or cut out. In view of the fact that the insulation resistance of the underground conductors is rather high and also because of the fact that the test set in order to be most useful must be mounted on the plow where it is subjected to a great deal of vibration, it is quite essential that the test set not only be capable of a relatively high degree of sensitivity but also must be designed to be insensible to the mechanical vibrations.

It is therefore the object of this invention to provide an apparatus adapted to continuously indicate the existence of damaged insulation or broken conductors during the process of plowing them underground.

The foregoing object is attained by this invention by providing a relatively simple and stable apparatus capable of simultaneously testing the insulation resistance and conductor continuity of an insulated wire during the plowing-in process which apparatus comprises in combination a gas-filled electron discharge device responsive to the appearance of either fault and a signaling means responsive to the discharge of the said discharge device.

Figure 1:
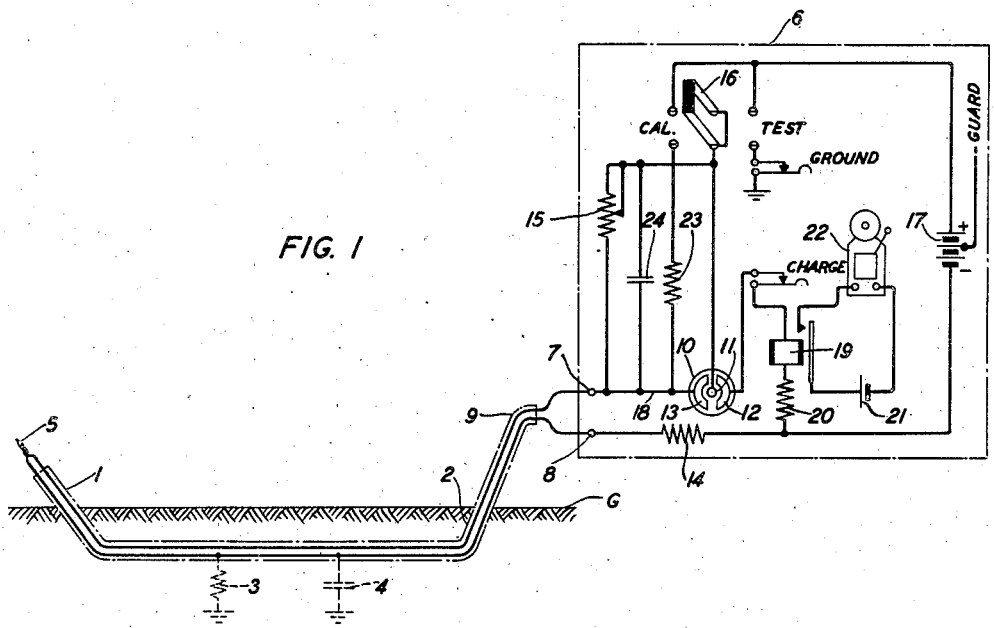
Figure 2:
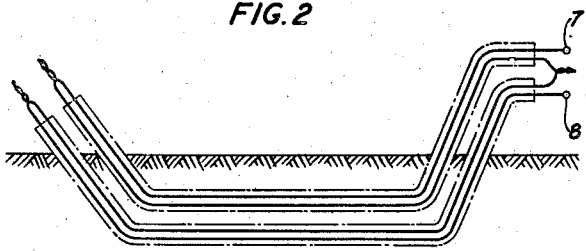

The invention may be better understood by reference to the following specification and the accompanying drawing in which:

Fig. 1 discloses the circuit of the apparatus connected to a two-conductor wire in the process of being plowed underground; and Fig. 2 discloses the method of connecting a plurality of conductors being installed underground simultaneously.

Referring now to Fig. 1 a two-conductor insulated wire 1 is schematically shown in the process of being plowed beneath the surface of the ground G. The plow is not shown but may be of any convenient design several of which are already familiar to this art. It is assumed that the plowshare is in the act of depositing the conductor under the ground at 2 and that the wire in the vicinity 9 of its connection with the test set is actually in the physical form of a relatively long coil wound on a reel or other suitable pay-off device. The ground connection for the "ground" key is obtained by means of the contact between the plowshare and the soil. These physical features have been deleted for the sake of clarity as they are not essential to a full understanding of the invention.

It will be understood that when the wire is embedded in the soil the soil forms a conducting sheath so that the conductors are insulated from the soil only by their insulation coating. The insulation thereupon acts as a distributed resistance and capacity which may for convenience be assumed lumped as at 3 and 4 respectively.

The inner ends of the two conductors of wire 1 are connected to the test set 6 at terminals 7, 8 and the outer ends are connected together as at 5 so that the two conductors are in series relation. The test set 6 contains a gas-filled electron discharge device 10 having an anode 11, cathode 12 and control electrode 13. This tube is preferably of the cold cathode type, such as the No. 313–AA but it may be any of the other cold or hot cathode tubes that contain at least three electrodes one of which maintains a controlling influence over conduction so long as the tube remains non-conductive. In the specific tube here illustrated either of the electrodes 12 or 13 may be connected to act as cathode or control electrode, the controlling action being in the form of a short auxiliary discharge gap between electrodes 12 and 13 adapted to start the discharge in the main gap between the anode 11 and the electrode 12 or 13 whichever is connected to act as the cathode. A source of direct current 17, preferably a battery because of its portability, supplies the necessary voltage to operate this tube. The positive pole of this battery is connected to the anode of the tube through switch 16. The control electrode 13 is supplied with the necessary bias voltage from a potentiometer formed by a rheostat 15, the conductors of wire 1 and resistor 14 which are connected in series and to direct current source 17 through switch 16. A conductor 18 connects control electrode 13 to the junction between rheostat 15 and the series-connected conductors of wire 1. The cathode 12 of tube 10 is connected to the negative side of direct current source 17 through a charge key and the coil of a relay 19 and a resistor 20.

Should for any reason the voltage between control electrode 13 and cathode 12 rise to the predetermined critical discharge voltage a discharge will take place therebetween initiating a discharge in the main gap between anode 11 and cathode 12. Current will then flow from direct current source 17 through switch 16, anode 11, cathode 12, relay coil 19, resistor 20 and back to the direct current source. Relay 19 will thereupon operate to close a local battery circuit from battery 21 to a signal device 22. This signal device may be of any suitable form and is herein specifically disclosed in the form of a bell.

In using this device it is first adjusted to operate on a predetermined minimum insulation resistance. This is done by calibrating the set with a standard resistor 23. To do this switch 16 is first thrown to CAL on the left so as to include standard resistor 23 in parallel with rheostat 15. If the wires 1 to be installed have not as yet been connected to terminals 7 and 8, terminals 7 and 8 must be short-circuited with a short length of conductor. Variations in the resistance of the conductors in wire 1 is immaterial since their total resistance is insignificant compared with the resistance of rheostat 15 and resistor 14. By way of a concrete example, the total series resistance of wire 1 may be in the neighborhood of 20 to 30 ohms whereas the resistance of rheostat 15 and resistor 14 is from 5 to 6 megohms. With switch 16 thrown to CAL as above described rheostat 15 is gradually lowered in resistance until the tube 10 fires to operate the signaling device 22. It will be understood that the lowering of the resistance of rheostat 15 causes a voltage rise across resistor 14 and hence a voltage rise between control electrode 13 and a cathode 12 of tube 10. Rheostat 15 is left at the discharge point to insure discharge in the event the insulation resistance lowers to a value equal to the standard resistance of resistor 23.

The set is now calibrated and is ready for the continuous testing of insulation resistance and conductor continuity of a cable during its installation beneath the surface of the ground. The short is removed from terminals 7 and 8 and the wire 1 is connected thereto as previously described. When the wire from a reel first enters the ground a sudden change in capacitance takes place due to the sudden increase of capacity 4. This would normally cause a short transient lowering in voltage across rheostat 15 which would result in a false discharge of tube 10. This is overcome by connecting a small condenser 24 in shunt with rheostat 15. Before beginning the plowing-in operation the "charge" key is held open and switch 16 thrown to "test" which grounds the positive side of battery 17 through the plowshare. It will be seen by inspection that this connects the lumped insulation resistance 3 and capacitance 4 in parallel with rheostat 15 and, in effect, is substituted for the standard resistor 23. The "charge" key is held open for a few seconds to prevent the charging current for capacitances 4 and 24 from operating tube 10 after which the "charge" key is permitted to close. The test set is now ready to begin the test and the plowing-in operation is commenced.

One of two faults may be detected during this plowing-in operation. Assume first that a defect in the insulation wall appears so that the resistance 3 suddenly lowers. This causes a voltage rise on control electrode 13 which results in tube 10 discharging and operating the signaling device 22. Since the bell signal is the same for either an open or a ground fault it is necessary to operate both the "charge" and the "ground" keys and then release the "charge" key while the "ground" key is held depressed. If the bell does not ring when the "charge" key is released it indicates that there is no open in the conductors of wire 1. Then to positively identify the fault as a ground fault, release the "ground" key and depress the "charge" key for a few seconds to charge capacitances 4 and 24. If upon again releasing the "charge" key the bell rings, the fault is a ground fault. If both faults are coincident, terminals 7, 8 must be shorted before making the ground fault test.

Now assume that the fault encountered is an open in one of the conductors of wire 1. This will result in an open circuit between terminals 7 and 8 of the test set and hence, a very high resistance between control electrode 13 and cathode 12. To test for an open, both the "ground" and "charge" keys are again operated and the "charge" key released. This time the signaling device 22 will operate upon the release of the "charge" key indicating the existence of an open conductor.

The exact location of the open conductor may be found by any of the means already well known in the art. The exact location of an insulation fault may be conveniently located by gradually removing the wire from the ground until the fault disappears, then wiping the surface of the wire with a damp cloth connected to ground until the fault is again indicated.

When simultaneously installing a plurality of conductors or wires in the ground at the same time it is only necessary to connect the conductors in series as shown in Fig. 2. The free ends 7 and 8 are then connected to the test set as in Fig. 1, the method of test being otherwise the same as that previously described.

An electrical guard arrangement may be provided for the circuit of the set by connecting the key frame and other metal parts of the manual controls to a tap on the direct current power supply as shown in Fig. 1. This serves to prevent leakage of the battery current between vital points of the circuit and thus increases the reliability of operation.

What is claimed is:

1. An apparatus for testing resistances comprising a source of direct current, a cold cathode tube having an anode, a cold cathode and an auxiliary electrode, means for connecting the resistance to be tested between said anode and said auxiliary electrode, an electrostatic capacity means connected between said anode and said auxiliary electrode, means associated with all three electrodes and said source adapted to make said tube responsive to a predetermined low value of said resistance, and signaling means interposed in the circuit of said cathode adapted to signal the response of said tube.

2. An apparatus for testing resistances comprising a source of direct current, a gas-filled electron discharge device having an anode, a cathode and an auxiliary electrode, means for connecting the resistance to be tested between said anode and said auxiliary electrode, an electrostatic capacity means connected between said anode and said auxiliary electrode, means associated with all three electrodes and said source adapted to make said tube responsive to a predetermined low value of said resistance, and signaling means interposed in the circuit of said cathode adapted to signal the response of said tube.

3. An apparatus for testing resistances comprising a source of direct current connected across two series-connected resistors, a gas-filled electron discharge device having an anode, a cathode and an auxiliary electrode, said auxiliary electrode being connected to the junction between said two resistors, means for connecting the resistance to be measured across said anode and said auxiliary electrode, an electrostatic capacity means connected between said anode and said auxiliary electrode, means connecting said anode to the positive terminal of the source, and signaling means interposed between said cathode and the negative terminal of the source.

4. An apparatus for simultaneously testing the insulation resistance and conductor continuity of an insulated wire having an effective outer conducting sheath contiguous thereto comprising in combination two resistors connected in series relation by the conductors of the wire under test, a source of direct current connected to the two free terminals of the two resistors, a gas-filled electron discharge device having an anode, a cathode and a control electrode, an indicating device, means for connecting the anode and cathode in series with the indicating device and to the direct current source, means including the conductors of the wire under test for connecting the control electrode to the cathode, and means for connecting the resistance offered by the insulation between the anode and control electrode.

5. An apparatus for simultaneously testing the insulation resistance and conductor continuity of an insulated wire having an effective outer conducting sheath contiguous thereto comprising two resistors having said wire interposed in series between them, a source of direct current, the positive pole of which is connected to the free end of the first of said two resistors and the negative pole to the free end of the second resistor, a gas-filled electron discharge device having an anode, a cathode and an auxiliary electrode, said auxiliary electrode being connected to the junction between said wire and said first-named resistor, means for connecting said sheath to said anode and the positive pole of said direct current source, and a signaling means interposed between said cathode and the negative pole of said source.

6. An apparatus for simultaneously testing the insulation resistance and conductor continuity of an insulated wire during the underground installation thereof by the plowing-in method comprising two resistors connected in series with a source of direct current, means for intercalating the conductors of said wire between the two resistors, a gas-filled electron discharge device having an anode, a cathode and a control electrode, a signaling device, means for connecting the anode to the positive pole of said source, means including said signaling device for connecting the cathode to the negative pole of said source, means for connecting the control electrode to the junction between said wire and the resistor connected to the positive pole of said source, and means for connecting the insulation resistance in shunt with said anode and control electrode.

7. An apparatus for simultaneously testing the insulation resistance and conductor continuity of an insulated wire during the underground installation thereof by the plowing-in method comprising two resistors connected in series with a source of direct current, means for intercalating the conductors of said wire between the two resistors, a gas-filled electron discharge device having an anode, cathode and control electrode, a signaling device, means for connecting the anode to the positive pole of said source, means including said signaling device for connecting the cathode to the negative pole of said source, means for connecting the control electrode to the junction between said wire and the resistor connected to the positive pole of said source, means for connecting the insulation resistance in shunt with said anode and control electrode, and means for preventing the discharge of said electron discharge device at the start of said plowing-in operation.

8. An apparatus for simultaneously testing the insulation resistance and conductor continuity of an insulated wire during the underground installation thereof by the plowing-in method comprising two resistors connected in series with a source of direct current, means for intercalating the conductors of said wire between the two resistors, a gas-filled electron discharge device having an anode, cathode and control electrode, a signaling device, means for connecting the anode to the positive pole of said source, means including said signaling device for connecting the cathode to the negative pole of said source, means for connecting the control electrode to the junction between said wire and the resistor connected to the positive pole of said source, means for connecting the insulation resistance in shunt with said anode and control electrode, and a condenser connected between said anode and control electrode to prevent the discharge of said electron discharge device at the start of said plowing-in operation.

9. An apparatus for simultaneously testing the insulation resistance and conductor continuity of an insulated wire during the underground installation thereof by the plowing-in method comprising a rheostat and a resistor connected in series with a source of direct current, the rheostat being connected to the positive pole thereof, means for intercalating the conductors of said wire between said rheostat and said resistor, a gas-filled electron discharge device having an anode, a cathode and control electrode, a signaling device, means for connecting the anode to the positive pole of said source, means including said signaling device for connecting the cathode to the negative pole of said source, means for connecting the control electrode to the junction between said wire and said rheostat and means for connecting the insulation resistance in shunt with said anode and control electrode.

10. An apparatus for simultaneously testing the insulation resistance and conductor continuity of an insulated wire during the underground installation thereof by the plowing-in method comprising a rheostat and a resistor connected in series with the source of direct current, said rheostat being connected to the positive pole thereof, means for intercalating the conductors of said wire between said rheostat and said resistor, a gas-filled electron discharge device having an anode, cathode and control electrode, a signaling device, means for connecting the anode to the positive pole of said source, means including said signaling device for connecting the cathode to the negative pole of said source, means for connecting the control electrode to the junction between said rheostat and said wire, means for connecting the insulation resistance in shunt with said anode and control electrode, and switching means connected in the anode and cathode circuits of said electron discharge device the manipulation whereof is adapted to distinguish between conductor discontinuity and low insulation resistance.

JAMES B. HAYS.